US011466773B2

(12) United States Patent
Nakasone et al.

(10) Patent No.: US 11,466,773 B2
(45) Date of Patent: Oct. 11, 2022

(54) HYDRAULIC CONTROL DEVICE

(71) Applicant: Honda Motor Co., Ltd., Tokyo (JP)

(72) Inventors: Makito Nakasone, Saitama (JP); Koji Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 17/094,829

(22) Filed: Nov. 11, 2020

(65) Prior Publication Data

US 2021/0140537 A1 May 13, 2021

(30) Foreign Application Priority Data

Nov. 12, 2019 (JP) .............................. JP2019-205049

(51) Int. Cl.
*F16H 61/00* (2006.01)
*F16H 61/662* (2006.01)

(52) U.S. Cl.
CPC ....... *F16H 61/0031* (2013.01); *F16H 61/662* (2013.01)

(58) Field of Classification Search
CPC ............... F16H 61/0031; F16H 61/662; F16H 61/0025; F16H 59/72; F16H 2059/366; F16H 2061/0015; F16H 2061/0037; F16H 2061/009
See application file for complete search history.

(56) References Cited

U.S. PATENT DOCUMENTS

| 2014/0119948 A1 | 5/2014 | Wi et al. |
| 2019/0048898 A1 | 2/2019 | Harada |
| 2019/0048899 A1* | 2/2019 | Hirai ...................... F04C 14/12 |

FOREIGN PATENT DOCUMENTS

| CN | 102403947 | 4/2012 |
| CN | 106233044 | 12/2016 |
| CN | 109386605 | 2/2019 |
| JP | 2002206630 | 7/2002 |
| JP | 2014034984 | 2/2014 |
| JP | 2015200369 | 11/2015 |

(Continued)

OTHER PUBLICATIONS

Office Action of China Counterpart Application, with English translation thereof, dated Dec. 20, 2021, pp. 1-10.

(Continued)

*Primary Examiner* — David J Hlavka
(74) *Attorney, Agent, or Firm* — JCIPRNET

(57) ABSTRACT

The disclosure provides a hydraulic control device. The operating/stopping of the second pump is determined based on a value of a difference between a reduced work rate of the first pump when the second pump is operated and a power consumption of the second pump. In a state where the second pump is stopped, the power consumption of the second pump is calculated based on an estimated value of a pressure of oil supplied to the hydraulic operation part and an estimated value of a pressure of oil supplied from the first pump to another hydraulic operation part or a lubrication target operating at a lower pressure than the hydraulic operation part. In a state where the second pump is operated, the power consumption of the second pump is calculated based on an actual rotation speed and an actual torque of the second pump.

8 Claims, 8 Drawing Sheets

(56) References Cited

FOREIGN PATENT DOCUMENTS

| | | |
|---|---|---|
| JP | 2019035423 | 3/2019 |
| JP | 2019035426 | 3/2019 |

OTHER PUBLICATIONS

"Office Action of Japan Counterpart Application" with English translation thereof, dated Jul. 26, 2022, p. 1-p. 10.
"Office Action of China Counterpart Application" with English translation thereof, dated Jul. 22, 2022, p. 1-p. 11.

* cited by examiner (a)

(b)

HYDRAULIC CONTROL DEVICE

CROSS-REFERENCE TO RELATED APPLICATION

This application claims the priority benefit of Japan application serial no. 2019-205049, filed on Nov. 12, 2019. The entirety of the above-mentioned patent application is hereby incorporated by reference herein and made a part of this specification.

BACKGROUND

Technical Field

The disclosure relates to a hydraulic control device in which a second pump and a bypass valve are connected in parallel between a first pump and a hydraulic operation part, and which supplies a first oil from the first pump to the hydraulic operation part via the bypass valve, or which pressurizes the first oil with the second pump and supplies the pressurized first oil as a second oil to the hydraulic operation part.

Description of Related Art

For example, Patent Document 1 discloses a hydraulic control device of a vehicle transmission in which a second pump (electric pump) and a bypass valve (check valve) operated by the drive of a motor are connected in parallel between a first pump (mechanical pump) and a hydraulic operation part of the transmission. In this case, when the engine is started, first, a first oil is supplied from the first pump to the hydraulic operation part via the bypass valve (first state). After that, the second pump is driven by the drive of the motor, and the first oil supplied from the first pump is pressurized by the second pump, and the pressurized first oil is supplied as the second oil from the second pump to the hydraulic operation part (second state). The hydraulic operation part includes, for example, an oil chamber of pulleys (drive pulley and driven pulley) of a belt-type continuously variable transmission.

In the hydraulic control device having the above configuration, switching between the first state in which the first oil is supplied to the hydraulic operation part (continuously variable transmission) and the second state in which the second oil is supplied is performed by opening and closing the bypass valve. That is, when the discharge amount (flow rate) of the second oil from the second pump exceeds the flow rate (discharge amount of the first oil from the first pump) of the first oil passing through the bypass valve, the hydraulic pressure (line pressure PH) in the downstream oil passage of the bypass valve becomes higher than the hydraulic pressure (output pressure P1) in the upstream oil passage. In this way, the bypass valve is closed, and the supply of the first oil from the first pump to the hydraulic operation part via the bypass valve is switched to the supply of the second oil from the second pump to the hydraulic operation part. As a result, the flow of the first oil to the oil passage is blocked, and the second oil is pumped to the hydraulic operation part by the second pump. On the other hand, when the discharge amount of the second pump is reduced due to the stop or the low rotation state of the second pump, the bypass valve is in the valve open state, and the first oil is supplied to the hydraulic operation part.

Then, in the hydraulic control device with the above configuration, when the output pressure of the first pump is reduced by the operation of the second pump as described above, the work load of the first pump is reduced, and the fuel efficiency of the vehicle can be expected to be improved.

However, whether or not the operation of the second pump actually contributes to the improvement of the fuel efficiency of the vehicle has to determined based on the work rate reduced for the first pump by the operation of the second pump and the power consumption of the second pump. However, whether it can be appropriately determined whether it actually contributes to the improvement of the fuel efficiency of the vehicle depends on how the method of calculating or estimating the work rate reduced for the first pump and the power consumption of the second pump is selected. Further, in such a determination, it is conceivable that the method of calculating (estimating) the work rate reduced for the first pump and the power consumption of the second pump may be switched according to the operational/stopped state of the second pump.

RELATED ART

Patent Document

[Patent Document 1] Japanese Laid-open No. 2015-200369

The disclosure has been made in view of the above-mentioned problems of the conventional technology, and the disclosure provides a hydraulic control device capable of determining whether the operation of the second pump actually contributes to the improvement of the fuel efficiency of the vehicle by a more appropriate method.

SUMMARY

In view of the foregoing, a hydraulic control device (10) according to the disclosure, in which a second pump (30) and a bypass valve (58) that are driven by a motor (32) are connected in parallel between a first pump (20) and a hydraulic operation part (56) of a transmission, and which is switchable between a first state of supplying a first oil from the first pump (20) to the hydraulic operation part (56) via the bypass valve (58) when the second pump (30) is stopped and a second state of pressurizing with the second pump (30) the first oil supplied from the first pump (20) and supplying the pressurized first oil as a second oil to the hydraulic operation part (56) when the second pump (30) is operated, includes: a control part (28) which controls operating/stopping of the second pump (30). The control part (28) determines the operating/stopping of the second pump (30) based on a value of a difference between a work rate (WA) reduced for the first pump (20) when the second pump (30) is operated and a power consumption (WB) of the second pump (30); in a state where the second pump (30) is stopped, calculates the power consumption (WB1) of the second pump (30) based on an estimated value of a pressure (PH) of oil supplied to the hydraulic operation part (56) and an estimated value of a pressure (P3) of oil supplied from the first pump (20) to another hydraulic operation part (114) or a lubrication target (108) operating at a lower pressure than the hydraulic operation part (56); and in a state where the second pump (30) is operated, calculates the power consumption (WB2) of the second pump (30) based on an actual rotation speed (NB) and an actual torque (TB) of the second pump (30).

DESCRIPTION OF THE EMBODIMENTS

Figure 1:
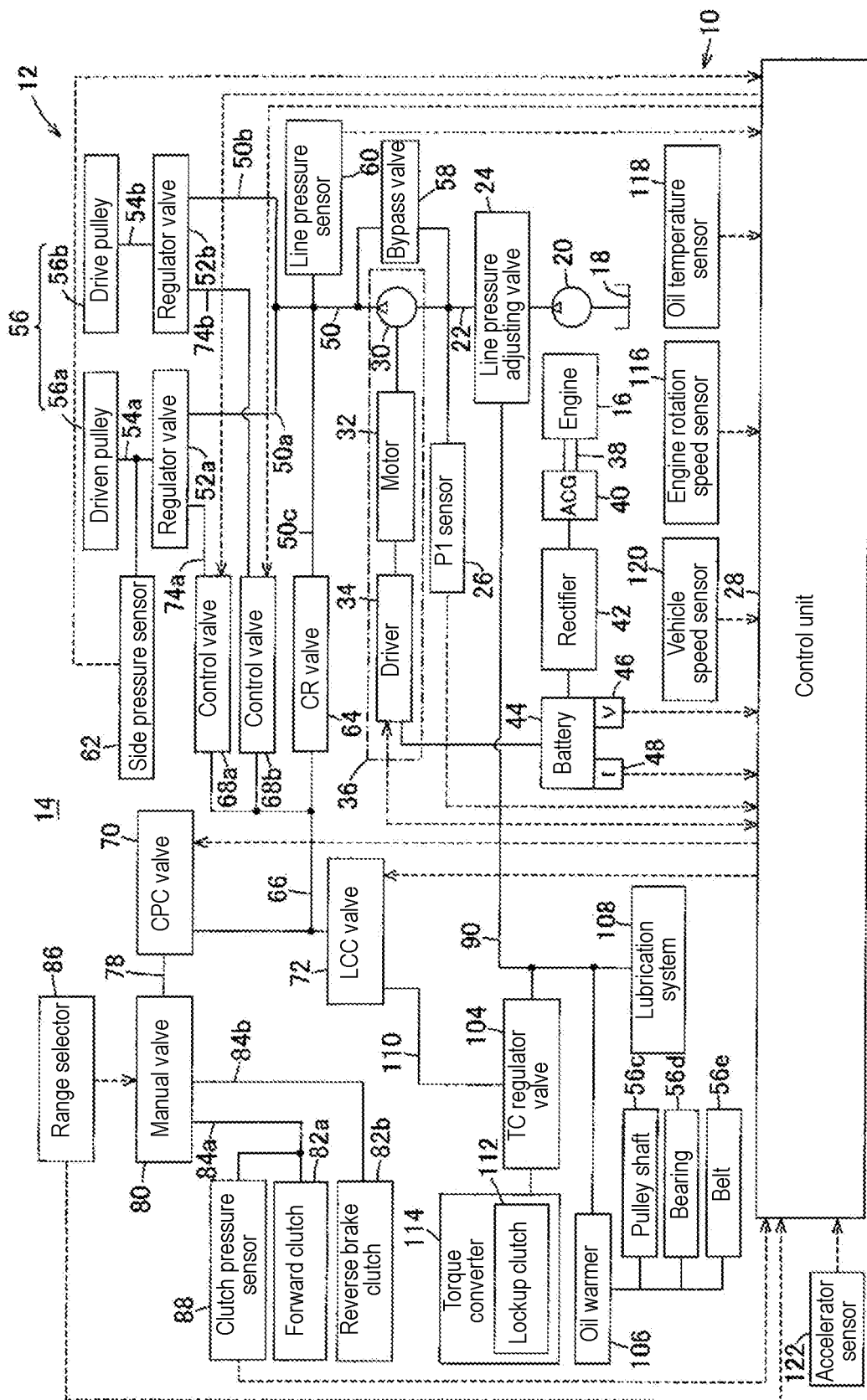
FIG. 1 is a configuration diagram of a hydraulic control device according to an embodiment of the disclosure.

According to the hydraulic control device of the disclosure, by determining the operating/stopping of the second pump based on the value of the difference between the reduced work rate of the first pump due to the operation of the second pump and the power consumption of the second pump, the second pump can be operated or stopped by appropriately determining the region where energy efficiency such as the fuel efficiency of the vehicle can be improved by operating the second pump.

In addition, when the second pump is stopped, by estimating the power consumption of the second pump based on the estimated value of the pressure of the oil supplied to the hydraulic operation part and the estimated value of the pressure of the oil supplied from the first pump to another hydraulic operation part or a lubrication target operating at a lower pressure than the hydraulic operation part, the operating/stopping of the second pump can be determined based on the general performance of the model regardless of the actual function (function that varies from product to product) of the first pump and the second pump or other devices mounted on the vehicle. On the other hand, when the second pump is operated, by estimating the power consumption of the second pump based on the actual rotation speed and the actual torque of the second pump, the operating/stopping of the second pump can be determined based on the function of the second pump actually mounted on the vehicle (function of the product itself).

In this way, when the second pump is stopped, the operating/stopping of the second pump is determined based on the general performance of the model, and when the second pump is operated, the operating/stopping of the second pump is determined based on the function of the devices actually mounted on the vehicle. As a result, the necessity of operating/stopping of the second pump can be more appropriately determined, whereby the fuel efficiency of the vehicle can be improved more effectively.

Further, in this hydraulic control device (10), the second pump (30) may be operated when the value of the difference between the work rate (WA) reduced for the first pump (20) and the power consumption (WB1) of the second pump (30) in the state where the second pump (30) is stopped is greater than a threshold value (W1), and the second pump (30) may be stopped when the value of the difference between the work rate (WA) reduced for the first pump (20) and the power consumption (WB2) of the second pump (30) in the state where the second pump (30) is operated is less than or equal to the threshold value (W1).

When the value of the difference between the work rate reduced for the first pump and the power consumption of the second pump is greater than the threshold value, energy reduction efficiency is better when the second pump is operated than when it is stopped. On the other hand, when the value of the difference between the work rate reduced for the first pump and the power consumption of the second pump is less than or equal to the threshold value, energy reduction efficiency is better when the second pump is stopped than when it is operated. Therefore, here, as described above, the operating/stopping of the second pump is determined based on whether the value of the difference between the work rate reduced for the first pump and the power consumption of the second pump is greater than the threshold value, whereby it is configured that energy reduction efficiency can be improved.

Further, in this case, values of the threshold value (W1) may be set to different values between the state where the second pump (30) is stopped and the state where the second pump (30) is operated. In this case, the threshold value (W11) in the state where the second pump (30) is stopped may be further set to a value greater than the threshold value (W12) in the state where the second pump (30) is operated.

When the operating/stopping of the second pump is determined based on whether the value of the difference between the work rate reduced for the first pump and the power consumption of the second pump is greater than the threshold value, by setting the threshold value in the state where the second pump is stopped to a value greater than the threshold value in the state where the second pump is operated, the hunting phenomenon in which the operating/stopping of the second pump is frequently switched can be effectively prevented.

Further, in this hydraulic control device (10), the first pump (20) is a mechanical pump which operates with a rotation of an engine (16), and the hydraulic control device (10) further includes: an engine rotation speed detection part (116) which detects a rotation speed of the engine (16); and an oil temperature detection part (118) which detects an oil temperature of the first oil or the second oil. The work rate (WA) reduced for the first pump (20) due to the operation of the second pump (30) is a value calculated based on the estimated value of the pressure (PH) of the oil supplied to the hydraulic operation part (56), the estimated value of the pressure (P3) of the oil supplied from the first pump (20) to the another hydraulic operation part (114) or the lubrication target (108) of the transmission, the rotation speed of the engine (16), and the oil temperature of the first oil or the second oil.

With this configuration, the work rate reduced for the first pump due to the operation of the second pump can be appropriately calculated. Therefore, the second pump can be operated or stopped by more appropriately determining the region where energy efficiency such as the fuel efficiency of the vehicle can be improved by operating the second pump.

The reference numerals in parentheses above indicate the drawing reference numbers of the corresponding components in the embodiments described later for reference.

In the hydraulic control device according to the disclosure, it can be determined whether the operation of the second pump actually contributes to the improvement of the fuel efficiency of the vehicle by a more appropriate method.

Hereinafter, embodiments of the disclosure will be described with reference to the accompanying drawings. FIG. 1 is a configuration diagram of a hydraulic control device according to an embodiment of the disclosure. A hydraulic control device 10 shown in the figure is applied to, for example, a vehicle 14 equipped with a transmission 12 which is a continuously variable transmission (CVT).

The hydraulic control device 10 has a first pump (mechanical pump) 20 that is driven by an engine 16 of the vehicle 14 and pumps up and delivers oil (hydraulic oil) stored in a reservoir 18. An oil passage 22 for flowing the oil pumped from the first pump 20 as a first oil is connected to the output side of the first pump 20. A line pressure adjusting valve (pressure adjusting valve) 24, which is a spool valve, is provided in the middle of the oil passage 22.

In the oil passage 22, an output pressure sensor (P1 sensor) 26 is disposed on the downstream side of the line pressure adjusting valve 24. The output pressure sensor 26 is a hydraulic sensor which sequentially detects the pressure (output pressure of the first pump 20) P1 of the first oil flowing through the oil passage 22, and which sequentially outputs a detection signal indicating the detected output pressure P1 to a control unit 28 (to be described later). Further, a second pump 30 having a capacity smaller than that of the first pump 20 is connected to the downstream side of the oil passage 22.

The second pump 30 is an electric pump which is driven by the rotation of a motor 32 provided in the vehicle 14 and which outputs the first oil supplied through the oil passage 22 as a second oil. In this case, the second pump 30 can pressurize the supplied first oil and pump the pressurized first oil as the second oil. The motor 32 rotates under the control of a driver 34. The driver 34 controls the drive of the motor 32 based on the control signal supplied from the control unit 28, and sequentially outputs a signal indicating the drive state of the motor 32 (for example, the rotation speed Nem of the motor 32 according to the rotation speed Nep of the second pump 30) to the control unit 28. An electric pump unit 36 is configured by the second pump 30, the motor 32, and the driver 34.

In addition, an ACG (alternating current generator) 40 is connected to a crankshaft 38 of the engine 16. The ACG 40 generates power by rotation of the crankshaft 38 due to the drive of the engine 16. The AC power generated by the ACG 40 is rectified by a rectifier 42 and charged into a battery 44. The battery 44 is provided with a voltage sensor 46 which detects a voltage V of the battery 44 and a current sensor 48 which detects a current I flowing from the battery 44. The voltage sensor 46 sequentially detects the voltage V of the battery 44, and sequentially outputs a detection signal indicating the detected voltage V to the control unit 28. The current sensor 48 sequentially detects the current I flowing from the battery 44, and sequentially outputs a detection signal indicating the detected current I to the control unit 28. The driver 34 is driven by the power supply from the battery 44.

An oil passage 50 is connected to the output side of the second pump 30. The oil passage 50 is branched into two oil passages 50a and 50b on the downstream side. One oil passage 50a is connected to a driven pulley 56a, which configures a belt-type continuously variable transmission mechanism 56 of the transmission 12, via a regulator valve 52a and an oil passage 54a. The other oil passage 50b is connected to a drive pulley 56b, which configures the continuously variable transmission mechanism 56, via a regulator valve 52b and an oil passage 54b.

A bypass valve 58 is connected in parallel with the second pump 30 between the two oil passages 22 and 50. The bypass valve 58 is a check valve provided so as to bypass the second pump 30, and allows the flow of oil (first oil) from the oil passage 22 on the upstream side to the oil passage 50 on the downstream side, while blocking the flow of oil (second oil) from the oil passage 50 on the downstream side to the oil passage 22 on the upstream side.

Further, the oil passage 54a is provided with a side pressure sensor 62 as a hydraulic sensor for detecting the pressure PDN (the pulley pressure, which is the side pressure of the driven pulley 56a) of the oil supplied to the driven pulley 56a.

A CR valve 64 is connected to the downstream side of an oil passage 50c branching from the oil passage 50. The upstream side of the CR valve 64 is connected to the oil passage 50c, and the downstream side thereof is connected to two control valves 68a and 68b, a CPC valve 70 and an LCC valve 72 via an oil passage 66. The CR valve 64 is a pressure reducing valve which decompresses the oil (second oil) supplied from the oil passage 50c, and supplies the decompressed oil to the control valves 68a and 68b, the CPC valve 70, and the LCC valve 72 via the oil passage 66.

Each of the control valves 68a and 68b is a normally open type solenoid valve having a solenoid, and is in a valve closed state while the control signal (current signal) is supplied from the control unit 28 and the solenoid is energized, and is in a valve open state when the solenoid is not energized.

Figure 2:
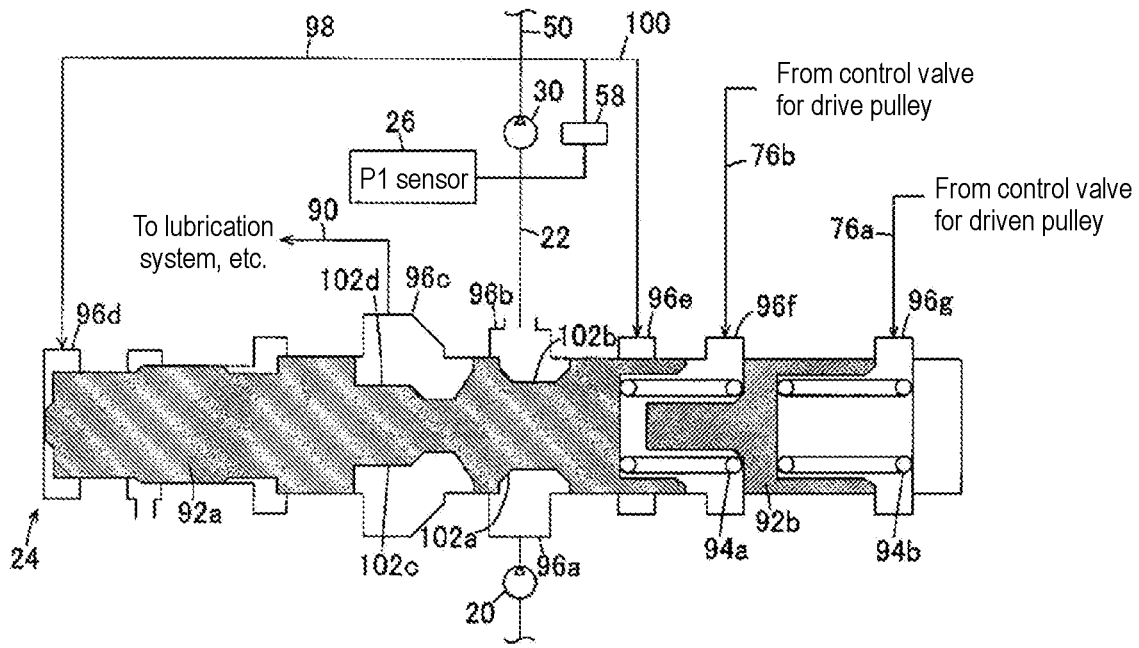
FIG. 2 is a configuration diagram of the line pressure adjusting valve.

One control valve 68a is a solenoid valve for the driven pulley 56a, and in the valve open state, the control valve 68a supplies the oil supplied from the CR valve 64 via the oil passage 66 to the regulator valve 52a via an oil passage 74a and also to the line pressure adjusting valve 24 via an oil passage 76a (see FIG. 2). In FIG. 1, for convenience, the oil passage 76a is not shown.

Further, the other control valve 68b is a solenoid valve for the drive pulley 56b, and in the valve open state, the control valve 68b supplies the oil supplied from the CR valve 64 via the oil passage 66 to the regulator valve 52b via an oil passage 74b and also to the line pressure adjusting valve 24 via an oil passage 76b (see FIG. 2). In addition, the oil passage 76b is also omitted in FIG. 1 for convenience.

Therefore, in one regulator valve 52a, the pressure of the oil supplied from the control valve 68a via the oil passage 74a is used as a pilot pressure, and when the line pressure PH of the oil supplied via the oil passages 50 and 50a is greater than or equal to the predetermined pressure, the valve is opened and the oil is supplied to the driven pulley 56a via the oil passage 54a. Further, in the other regulator valve 52b, the pressure of the oil supplied from the control valve 68b via the oil passage 74b is used as a pilot pressure, and when the line pressure PH of the oil supplied via the oil passages 50 and 50b is greater than or equal to the predetermined pressure, the valve is in the valve open state, and the oil is supplied to the drive pulley 56b via the oil passage 54b.

In addition, the control valve 68a can adjust the pressure of the oil output to the oil passages 74a and 76a. Further, the control valve 68b can adjust the pressure of the oil output to the oil passages 74b and 76b.

The upstream side of the CPC valve 70 is connected to the oil passage 66, and the downstream side thereof is connected to a manual valve 80 via an oil passage 78. The CPC valve 70 is a solenoid valve for a forward clutch 82a and a reverse brake clutch 82b. In this case, while the control signal is supplied from the control unit 28 and the solenoid is energized, the CPC valve 70 is in the valve open state, and the oil passages 66 and 78 are communicated with each other, and the oil is supplied to the manual valve 80.

The upstream side of the manual valve 80 is connected to the oil passage 78; the downstream side thereof is connected to the forward clutch 82a via an oil passage 84a, and is connected to the reverse brake clutch 82b via an oil passage 84b. The manual valve 80 is a spool valve, and when a driver operates a range selector 86 provided near the driver's seat of the vehicle 14 to select any one of the shift ranges such as P (parking), R (reverse), N (neutral), and D (forward, drive), in the manual valve 80, a spool (not shown) moves for a predetermined amount in the axial direction according to the selected shift range. In this way, the manual valve 80 enables the vehicle 14 to travel in the forward direction by supplying the oil supplied via the oil passage 78 to the forward clutch 82a via the oil passage 84a, or enables the vehicle 14 to travel in the reverse direction by supplying the oil to the reverse brake clutch 82b via the oil passage 84b. A clutch pressure sensor 88 for detecting the pressure (clutch pressure) of the oil supplied to the oil passage 84a is provided in the middle of the oil passage 84a.

A low-pressure hydraulic operation part to which the first oil is supplied via an oil passage 90 is connected to the oil passage 90 that branches from the oil passage 22 via the line pressure adjusting valve 24. A TC regulator valve 104 and an oil warmer 106 are connected to the downstream side of the oil passage 90 as the low-pressure hydraulic operation part, and a lubrication system 108 of the transmission 12 is connected as a lubrication target. The TC regulator valve 104 is connected to the LCC valve 72 via an oil passage 110, and a torque converter 114 incorporating a lockup clutch 112 is connected to the downstream side thereof.

The LCC valve 72 is a solenoid valve for the lockup clutch 112, and while the control signal is supplied from the control unit 28 and the solenoid is energized, the LCC valve 72 is in the valve open state, and the oil passages 66 and 110 are communicated with each other to supply the oil to the TC regulator valve 104. The TC regulator valve 104 is a spool valve, and the spool (not shown) operates in the axial direction in response to the pressure of the oil supplied from the LCC valve 72 via the oil passage 110, whereby a third oil supplied via the oil passage 90 is decompressed, and the decompressed third oil is supplied to the torque converter 114 and the lockup clutch 112.

The oil warmer 106 warms the third oil supplied from the oil passage 90 to a predetermined temperature, and supplies the warmed third oil to a pulley shaft 56c, a bearing 56d, and a belt 56e that configure the continuously variable transmission mechanism 56. Further, the lubrication system 108 is various lubrication targets such as bearings and gears that configure the transmission 12.

The hydraulic control device 10 further includes an engine rotation speed sensor 116, an oil temperature sensor 118, a vehicle speed sensor 120, an accelerator sensor 122, and the control unit 28. The engine rotation speed sensor 116 sequentially detects the engine rotation speed New of the engine 16 according to the rotation speed Nmp of the first pump 20, and sequentially outputs a detection signal indicating the detected engine rotation speed New (rotation speed Nmp) to the control unit 28. The oil temperature sensor 118 sequentially detects the temperature (oil temperature) To of the first oil or the second oil, and sequentially outputs a detection signal indicating the detected oil temperature To to the control unit 28. The vehicle speed sensor 120 sequentially detects the vehicle speed Vs of the vehicle 14, and sequentially outputs a detection signal indicating the detected vehicle speed Vs to the control unit 28. The accelerator sensor 122 sequentially detects the opening degree of an accelerator pedal (not shown) operated by the driver, and sequentially outputs a detection signal indicating the detected opening degree to the control unit 28.

The control unit 28 is a microcomputer such as a CPU which functions as a TCU (transmission control unit) which controls the transmission 12 or an ECU (engine control unit) which controls the engine 16. Then, the control unit 28 executes various controls on the hydraulic control device by reading and executing programs stored in a storage unit (not shown).

[Line Pressure Adjusting Valve 24]

FIG. 2 is a configuration diagram of the line pressure adjusting valve 24. The line pressure adjusting valve 24 is a spool valve incorporating a first spool 92a and a second spool 92b. The first spool 92a is a relatively long valve body having a substantially I-shaped cross section, and is disposed inside the line pressure adjusting valve 24 along the axial direction (left-right direction in FIG. 2). The second spool 92b is a spool having a substantially Y-shaped cross section, which is shorter than the first spool 92a, and is disposed inside the line pressure adjusting valve 24 on the right side of the first spool 92a along the axial direction. In this case, a first elastic member 94a is inserted between the first spool 92a and the second spool 92b, and the first elastic member 94a urges the first spool 92a to the left direction in FIG. 2. Further, the second spool 92b is urged toward the first spool 92a side by a second elastic member 94b disposed on the right side of the second spool 92b.

The line pressure adjusting valve 24 has first to seventh ports 96a to 96g. The first port 96a and the second port 96b are provided so as to face each other at the central part of the outer peripheral surface of the line pressure adjusting valve 24. Further, the first port 96a and the second port 96b are communicated with each other regardless of the position of the first spool 92a through a groove and the like (not shown) formed on the inner peripheral surface side of the line pressure adjusting valve 24 around the axial direction, and configures a part of the oil passage 22. In this case, the first port 96a is an inlet port for the first oil in the line pressure adjusting valve 24, and the second port 96b is an outlet port for the first oil.

Then, with the position of the second port 96b on the outer peripheral surface of the line pressure adjusting valve 24 as the center, the third port 96c and the fourth port 96d are sequentially provided on the left side of FIG. 2 so as to be separated from the second port 96b, while the fifth to seventh ports 96e to 96g are sequentially provided on the right side of FIG. 2 so as to be separated from the second port 96b.

The third port 96c is provided adjacent to the left side of the second port 96b, and the oil passage 90 is connected to the third port 96c. The fourth port 96d is provided at the left end of the line pressure adjusting valve 24, and is connected to the oil passage 50 via an oil passage 98. The fifth port 96e is provided adjacent to the right side of the second port 96b, and is connected to the oil passage 50 via an oil passage 100. In addition, in FIG. 1, for convenience, the oil passages 98 and 100 are not shown. The sixth port 96*f* is provided on the right side of the fifth port 96*e* and is connected to the oil passage 76*b*. The seventh port 96*g* is provided at the right end of the line pressure adjusting valve 24 and is connected to the oil passage 76*a*.

Therefore, oil (first oil or second oil) having the line pressure PH flowing through the oil passage 50 is supplied to the fourth port 96*d* and the fifth port 96*e* via the oil passages 98 and 100, respectively. Further, the oil is supplied from the control valve 68*b* to the sixth port 96*f* via the oil passage 76*b*. Moreover, the oil is supplied from the control valve 68*a* to the seventh port 96*g* via the oil passage 76*a*.

On the outer peripheral surface of the first spool 92*a*, by forming grooves in the parts facing the first port 96*a* and the second port 96*b* around the axial direction, the part facing the first port 96*a* is formed as a recess 102*a*, and the part facing the second port 96*b* is formed as a recess 102*b*. Further, on the outer peripheral surface of the first spool 92*a*, a recess 102*c* adjacent to the recess 102*a* and a recess 102*d* adjacent to the recess 102*b* are formed by forming grooves in the parts facing the third port 96*c* around the axial direction.

Further, in the line pressure adjusting valve 24, the pressure (line pressure PH, output pressure P1) of the oil supplied to the fourth port 96*d* is greater than the pressure of the oil supplied to the sixth port 96*f* and the seventh port 96*g*. However, since the oil contact areas of the valves are different, the pressures are balanced, and when the oil with a pressure higher than the balance point is supplied to the fourth port 96*d*, the first spool 92*a* moves to the right side in FIG. 2 due to the line pressure PH against the elastic force of the first elastic member 94*a* and the pressure of the oil supplied to the sixth port 96*f*. As a result, the recess 102*c* and the first port 96*a* communicate with each other, and the first oil can flow into the oil passage 90 via the first port 96*a*, the recesses 102*c* and 102*d*, and the third port 96*c*. Further, in the line pressure adjusting valve 24, the pressure of the first oil flowing through the oil passage 90 may be less than the output pressure P1 of the first oil flowing through the second pump 30 and the bypass valve 58 via the oil passage 22. Therefore, in the following description, the first oil flowing through the oil passage 90 may be referred to as the third oil.

Next, the operation of the hydraulic control device 10 according to the embodiment configured as described above will be described. Here, a case will be described in which the control unit 28 drives and controls the second pump 30 by performing the feedback control on the motor 32 mainly using the output pressure P1 of the first pump 20 or the line pressure PH (estimated value) (to be described later).

<Basic Operation of Hydraulic Control Device 10>

Prior to the description of the operation of the feedback control, the basic operation of the hydraulic control device 10 will be described. In this basic operation, the operation of the hydraulic system which supplies the oil from the reservoir 18 to the continuously variable transmission mechanism 56 via the first pump 20 and the like will be described.

First, when the first pump 20 starts driving due to the drive of the engine 16, the first pump 20 pumps up the oil in the reservoir 18 and starts pumping the pumped-up oil as the first oil. As a result, the first oil flows through the oil passage 22 via the first port 96*a* and the second port 96*b*. The output pressure sensor 26 sequentially detects the pressure (output pressure) P1 of the first oil flowing through the oil passage 22, and outputs a signal indicating the detection result to the control unit 28. Further, the engine rotation speed sensor 116 sequentially detects the engine rotation speed New, and sequentially outputs a signal indicating the detection result to the control unit 28.

Figure 3:
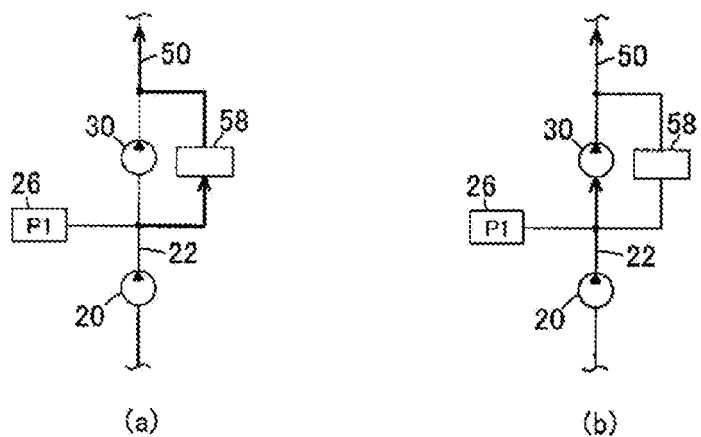
In FIG. 3, (a) is a diagram showing an oil flow in a first state, and (b) is a diagram showing an oil flow in a second state.

In this case, since the motor 32 is not driven, the first oil flowing through the oil passage 22 flows to the oil passage 50 via the bypass valve 58 along the line of the thick line, as schematically shown in (a) of FIG. 3. As a result, the first oil is supplied to the fourth port 96*d* via the oil passages 50 and 98, and is supplied to the fifth port 96*e* via the oil passages 50 and 100, and is also supplied to the CR valve 64 via the oil passages 50 and 50*c*. The CR valve 64 decompresses the supplied first oil, and supplies the decompressed first oil to the control valves 68*a* and 68*b* via the oil passage 66, respectively.

Here, control signals (current values IDN, IDR) are supplied in advance from the control unit 28 to the solenoids of the control valves 68*a* and 68*b*, and the control valves 68*a* and 68*b* are in the valve closed state. Therefore, when the supply of the control signal to each solenoid is stopped, the control valves 68*a* and 68*b* are switched from the valve closed state to the valve open state. As a result, the control valve 68*a* supplies the oil to the regulator valve 52*a* via the oil passage 74*a* and also supplies the oil to the seventh port 96*g* via the oil passage 76*a*. Further, the control valve 68*b* supplies the oil to the regulator valve 52*b* via the oil passage 74*b* and also supplies the oil to the sixth port 96*f* via the oil passage 76*b*.

The regulator valve 52*a* uses the pressure of the oil supplied via the oil passage 74*a* as the pilot pressure, and when the pressure of the first oil is greater than or equal to a predetermined pressure, the regulator valve 52*a* is in a communication state, and the first oil is supplied to the driven pulley 56*a* via the oil passage 54*a*. The side pressure sensor 62 sequentially detects the pressure (pulley pressure PDN, which is also the side pressure) of the first oil supplied to the driven pulley 56*a*, and sequentially outputs a signal indicating the detection result to the control unit 28.

In addition, the regulator valve 52*b* uses the pressure of the oil supplied via the oil passage 74*b* as the pilot pressure, and when the pressure (line pressure PH) of the first oil is greater than or equal to a predetermined pressure, the regulator valve 52*b* is in a communication state, and the first oil is supplied to the drive pulley 56*b* via the oil passage 54*b*.

Further, in the line pressure adjusting valve 24, the first oil is supplied to the fourth port 96*d*, and the oil is supplied from the control valve 68*b* to the sixth port 96*f*, while the oil is also supplied from the control valve 68*a* to the seventh port 96*g*. In this case, since the pressure (line pressure PH, output pressure P1) of the first oil is greater than the pressure of the oil from each of the control valves 68*a* and 68*b*, the first spool 92*a* moves to the right side in FIG. 2 due to the line pressure PH against the elastic force of the first elastic member 94*a* and the pressure of the oil. As a result, the recess 102*c* and the first port 96*a* communicate with each other, and the first oil can be supplied to a low-pressure system such as the lubrication system 108 as the third oil via the first port 96*a*, the recesses 102*c* and 102*d*, the third port 96*c*, and the oil passage 90.

In this way, when a control signal is supplied from the control unit 28 to the driver 34 in the state where the first pump 20 is being driven, the driver 34 drives the motor 32 based on the control signal and drives the second pump 30. As a result, the second pump 30 outputs the first oil flowing through the oil passage 22 as the second oil.

Then, when the second oil flows through the oil passage 50 and the flow rate of the second oil (discharge flow rate of the second pump 30) exceeds the flow rate of the first oil (discharge flow rate of the first pump 20), in the bypass valve 58, the pressure (line pressure PH) of the oil on the oil passage 50 side becomes greater than the pressure (output pressure P1) of the oil on the oil passage 22 side. As a result, the bypass valve 58 is in the valve closed state, and the supply of the first oil from the first pump 20 to the continuously variable transmission mechanism 56 and the like via the bypass valve 58 and the oil passage 50 as shown in (a) of FIG. 3 is switched to the supply of the second oil from the second pump 30 to the continuously variable transmission mechanism 56 and the like via the oil passage 50 as shown by the thick line in (b) of FIG. 3. As a result, the flow of the first oil to the oil passage 50 is blocked, and the second oil is pumped by the second pump 30 to the continuously variable transmission mechanism 56 and the like. The second oil is supplied to the fourth port 96d via the oil passages 50 and 98, is supplied to the fifth port 96e via the oil passages 50 and 100, and is supplied to the CR valve 64. Further, the driver 34 sequentially outputs a signal indicating the motor rotation speed Nem of the motor 32 (rotation speed Nep of the second pump 30) to the control unit 28.

The CR valve 64 decompresses the supplied second oil, and supplies the decompressed second oil to the control valves 68a and 68b via the oil passage 66, respectively. Since the control valve 68a is in the valve open state, it supplies the oil to the regulator valve 52a via the oil passage 74a and also supplies the oil to the seventh port 96g via the oil passage 76a. Further, since the control valve 68b is also in the valve open state, it supplies the oil to the regulator valve 52b via the oil passage 74b and also supplies the oil to the sixth port 96f via the oil passage 76b.

As a result, the regulator valve 52a supplies the second oil to the driven pulley 56a with the pressure of the oil supplied via the oil passage 74a as the pilot pressure. The side pressure sensor 62 sequentially detects the pressure (side pressure PDN) of the second oil supplied to the driven pulley 56a and outputs it to the control unit 28. In addition, the regulator valve 52b supplies the second oil to the drive pulley 56b with the pressure of the oil supplied via the oil passage 74b as the pilot pressure.

In this way, since the pressurized second oil is supplied to the driven pulley 56a and the drive pulley 56b, the pressure (output pressure) P1 of the first oil can be reduced, and the load on the first pump 20 can be reduced. In this case, the first spool 92a moves to the right side in FIG. 2 with the pressure (line pressure PH) of the second oil supplied to the fourth port 96d of the line pressure adjusting valve 24 as the pilot pressure, and the output pressure P1 can be reduced by increasing the opening degree (opening area) between the first port 96a and the recess 102c.

Further, in the line pressure adjusting valve 24, the oil is supplied to the sixth port 96f and the seventh port 96g, respectively. In this case, since the line pressure PH is greater than the pressure of the oil, the first spool 92a further moves to the right side in FIG. 2 against the elastic force of the first elastic member 94a and the pressure of the oil. As a result, when the recess 102b and the fifth port 96e communicate with each other, the oil passage 22 and the oil passage 100 communicate with each other. As a result, an increase in the pressure (line pressure PH) of the second oil supplied to the oil passage 100 is suppressed, and the line pressure PH can be maintained at a predetermined pressure.

Here, a state in which the second pump 30 is operated and the second oil is supplied from the second pump 30 will be described in detail. In addition, in the following description, the state in which the second pump 30 is operated and the second oil is supplied from the second pump 30 is referred to as a "servo state."

Here, first, in describing the change of each value in the servo state, the calculation of the target rotation speed NA of the second pump 30 in the servo state will be described. In the calculation of the target rotation speed NA of the second pump 30, first, the control unit 28 calculates the estimated value of the line pressure PH, and calculates an estimated value of the pressure P3 of the third oil (hereinafter referred to as "low hydraulic pressure").

<Estimation of Line Pressure PH>

Figure 4:
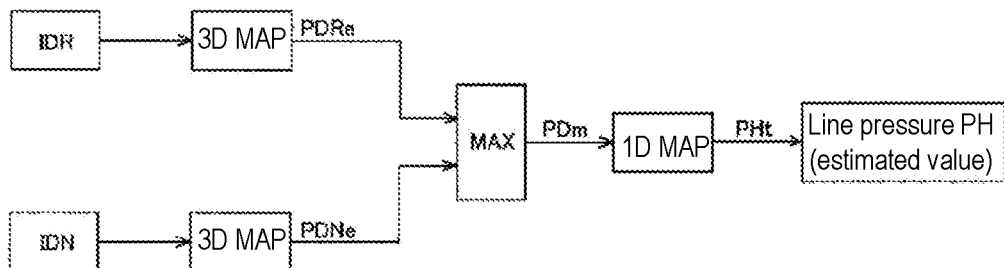
FIG. 4 is a block diagram showing a calculating procedure of an estimated value of the line pressure.

FIG. 4 is a block diagram showing a calculating procedure of an estimated value of the line pressure PH. The control unit 28 uses the current value IDN, which is a control signal supplied to the solenoid of the control valve 68a, and the current value IDR, which is a control signal supplied to the solenoid of the control valve 68b, and refers to various maps stored in advance to calculate an estimated value of the line pressure PH.

The control unit 28 estimates the line pressure PH (estimated line pressure PH) according to a command value with the side pressure (pulley pressure) PDN or the like as the command value.

The side pressure PDN of the driven pulley 56a is the pressure of the oil supplied from the oil passage 50 to the driven pulley 56a via the oil passage 50a, the regulator valve 52a and the oil passage 54a. The side pressure PDN can be adjusted according to the pressure (pilot pressure) of the oil supplied from the control valve 68a to the regulator valve 52a via the oil passage 74a. Further, the side pressure PDR of the drive pulley 56b is the pressure of the oil supplied from the oil passage 50 to the drive pulley 56b via the oil passage 50b, the regulator valve 52b and the oil passage 54b. The side pressure PDR can be adjusted according to the pressure (pilot pressure) of the oil supplied from the control valve 68b to the regulator valve 52b via the oil passage 74b.

Therefore, the control unit 28 refers to a 3D map stored in advance, and obtains an estimated value of the side pressure PDN (estimated side pressure PDNe serving as a command value) according to the control signal (current value IDN) supplied to the solenoid of the control valve 68a. Further, the control unit 28 refers to a 3D map stored in advance, and obtains an estimated value of the side pressure PDR (estimated side pressure PDRe serving as a command value) according to the control signal (current value IDR) supplied to the solenoid of the control valve 68b.

Each 3D map is a three-dimensional map showing the relationship between the current values IDN and IDR and the estimated side pressures PDNe and PDRe generated for each oil temperature To of the first oil or the second oil. Therefore, the control unit 28 specifies the estimated side pressures PDNe and PDRe according to the current oil temperature To and the current values IDN and IDR from the 3D maps.

Next, the control unit 28 determines the higher hydraulic pressure value of the two specified estimated side pressures PDNe and PDRe as a target side pressure PDm. Next, the control unit 28 refers to a 1D map stored in advance, and specifies a target value PHt of the line pressure PH according to the target side pressure PDm. The 1D map is a one-dimensional map showing the relationship between the target side pressure PDm and the line pressure PH.

Finally, the control unit 28 determines a value obtained by adding a predetermined amount of margin to the target value PHt as an estimated value of the line pressure PH (estimated line pressure PH).

<Estimation of Low Hydraulic Pressure P3>

The control unit 28 refers to multiple maps corresponding to each component of the hydraulic system of the transmission 12 stored in advance to estimate the pressure (low hydraulic pressure) P3 of the third oil supplied to the TC regulator valve 104, the oil warmer 106, and the lubrication system 108 via the oil passage 90.

The characteristics of each component configuring the hydraulic system of the transmission 12 are stored in advance as a map. Therefore, the control unit 28 estimates the low hydraulic pressure P3 (estimated value P3e) by using the map of the characteristics of each component stored in advance.

Specifically, the control unit 28 estimates the pressure PCR of the oil passing through the CR valve 64 by using the estimated value of the line pressure PH and the current value ICPC of the control signal supplied to the CPC valve 70. In this case, the control unit 28 obtains the pressure PCR for each temperature and sets the obtained characteristics of the pressure PCR as a map.

Next, the control unit 28 estimates the pressure PLCC of the oil passing through the TC regulator valve 104 by using the map of the pressure PCR and the current value ILCC of the control signal supplied to the solenoid of the LCC valve 72. The pressure PLCC is also the pressure of the oil supplied to the lockup clutch 112. In this case, the control unit 28 obtains the pressure PLCC for each temperature and sets the obtained characteristics of the pressure PLCC as a map.

Next, the control unit 28 obtains the leakage amount of the hydraulic path leading to the driven pulley 56a and the drive pulley 56b via the oil passages 50, 50a and 50b from the maps of the current values IDN and IDR and the side pressures PDN and PDR. Further, the control unit 28 obtains the leakage amount of the LCC valve 72 from the map of the current value ILCC, and obtains the leakage amount of the CR valve 64 and the leakage amount of the CPC valve 70 from the map of the current value ICPC.

Further, the control unit 28 calculates the flow rate (shift flow rate of the driven pulley 56a and the drive pulley 56b) of the second oil to be supplied to the continuously variable transmission mechanism 56 during the shift operation from the area of the pulley chamber of the driven pulley 56a and the drive pulley 56b and the rotation speed of the driven pulley 56a and the drive pulley 56b.

Then, the control unit 28 calculates the flow rate QPH of the oil to be supplied to the high-pressure hydraulic system from the second pump 30 to the driven pulley 56a and the drive pulley 56b by adding the leakage amount in the hydraulic path leading to the driven pulley 56a and drive pulley 56b, the leakage amount of the LCC valve 72, the leakage amount of the CPC valve 70, the leakage amount of the CR valve 64, the shift flow rate, and the leakage amount of the driven pulley 56a and the drive pulley 56b.

Next, the control unit 28 calculates the flow rate Q3 of the third oil supplied to the low-pressure system via the oil passage 90 by subtracting the flow rate QPH from the discharge flow rate of the first oil from the first pump 20.

Next, the control unit 28 calculates an estimated value of the low hydraulic pressure P3 according to the oil temperature To of the first oil or the second oil based on the pressure PLCC of the oil passing through the TC regulator valve 104 and the flow rate Q3 of the third oil.

Figure 5:
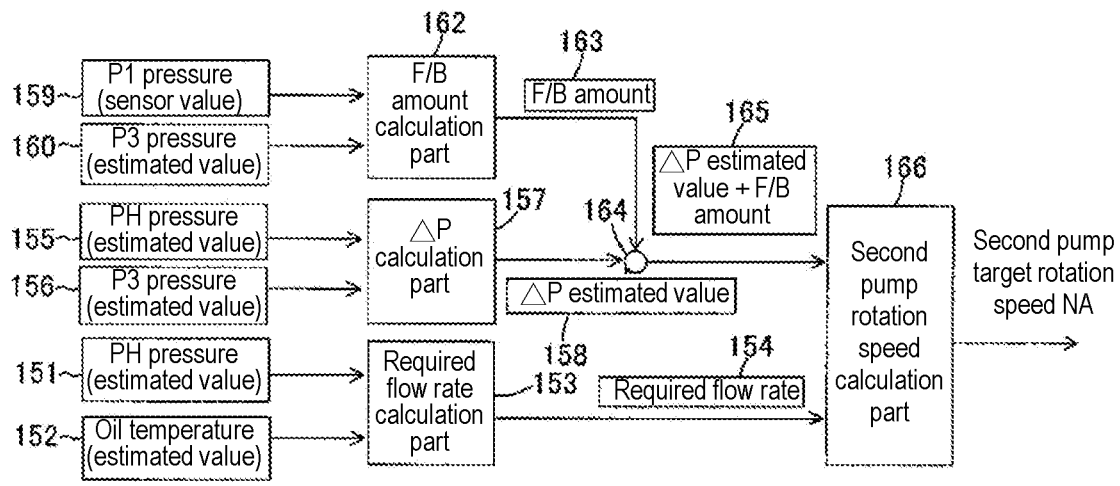
FIG. 5 is a block diagram showing a calculating procedure of the target rotation speed of the second pump.

FIG. 5 is a block diagram showing a calculating procedure of the target rotation speed NA of the second pump 30. In the calculation of the target rotation speed of the second pump 30, as shown in FIG. 5, a required flow rate calculation part 153 calculates an oil flow rate (required flow rate) 154 required for the continuously variable transmission mechanism 56, which is a hydraulic operation part, by using an estimated value 151 of the line pressure PH and an oil temperature 152 detected by the oil temperature sensor 118. Further, a differential pressure calculation part 157 obtains an estimated value 158 of the differential pressure $\Delta P$ (=line pressure PH–low hydraulic pressure P3) by using an estimated value 155 of the line pressure PH and an estimated value 156 of the low hydraulic pressure P3. Further, an F/B amount calculation part 162 calculates a feedback amount 163 by using a detected value 159 of the output pressure P1 detected by the output pressure sensor 26 and an estimated value 160 of the low hydraulic pressure P3. Then, an addition part 164 calculates an addition value 165 by adding the feedback amount 163 to the calculated value 158 of the differential pressure $\Delta P$, and a rotation speed calculation part 166 calculates the target rotation speed NA of the second pump 30 by using this addition value 165 and the required flow rate 154.

Figure 6:
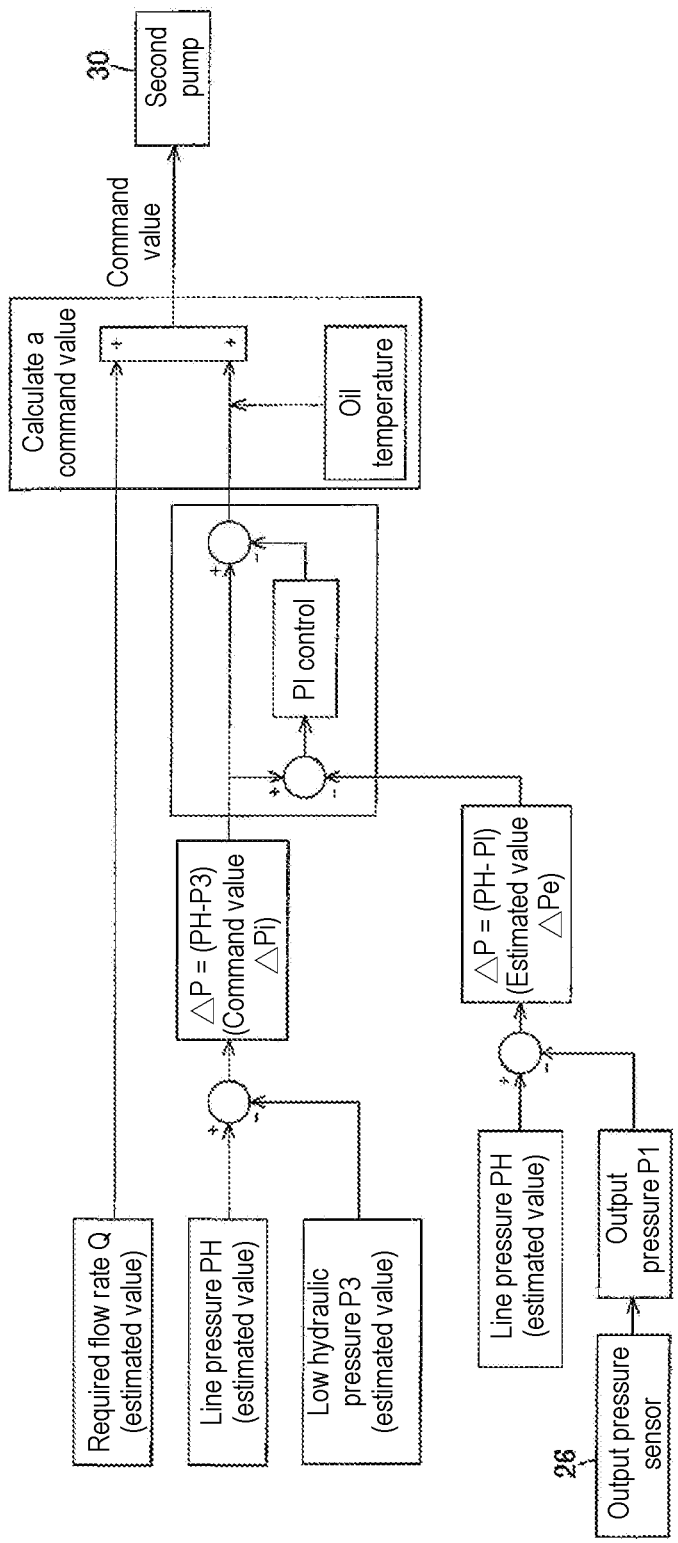
FIG. 6 is a block diagram showing a processing procedure in a control unit which performs the feedback control.

The calculation of the feedback amount by the F/B amount calculation part 162 will be described in detail. FIG. 6 is an illustrating diagram showing processing in the control unit 28 which performs the feedback control with respect to the differential pressure $\Delta P$ by using the output pressure P1 detected by the output pressure sensor 26. That is, FIG. 6 is a control method for feedback-controlling the output pressure P1 with the estimated value of the low hydraulic pressure P3 as the target value by feeding back to the control unit 28 the change amount of the output pressure P1 as the rotation speed of the second pump 30 increases.

When the estimated value of the line pressure PH is estimated and the estimated value of the low hydraulic pressure P3 is estimated, the control unit 28 generates a command value $\Delta Pi$ (=PHe–P3e) of the differential pressure $\Delta P$ by subtracting the estimated value of the low hydraulic pressure P3 from the estimated value of the line pressure PH. Further, the control unit 28 calculates an estimated value $\Delta Pe$ (=PHe–P1) of the differential pressure $\Delta P$ by subtracting the output pressure P1 detected by the output pressure sensor 26 from the estimated value of the line pressure PH.

Next, the control unit 28 obtains a deviation $\Delta e$ (=$\Delta Pi$–$\Delta Pe$) by subtracting the estimated value $\Delta Pe$ from the command value $\Delta Pi$. The obtained deviation $\Delta e$ is passed through a proportional integration element (PI control) and added to the command value $\Delta Pi$. That is, the control unit 28 performs the feedback control with the deviation $\Delta e$ as the feedback amount for the command value $\Delta Pi$.

In this case, $\Delta e = \Delta Pi - \Delta Pe = (PHe-P3e)-(PHe-P1)=P1-P3e$. Therefore, the control unit 28 performs the feedback control for the command value $\Delta Pi$ so that the output pressure P1 becomes an estimated value of the low hydraulic pressure P3. Next, the control unit 28 adjusts the command value $\Delta Pi$ after the feedback control in consideration of the oil temperature To of the first oil or the second oil as well. After that, the required flow rate Q and the adjusted command value $\Delta Pi$ are used to calculate the command value of the rotation speed for the second pump 30.

Figure 7:
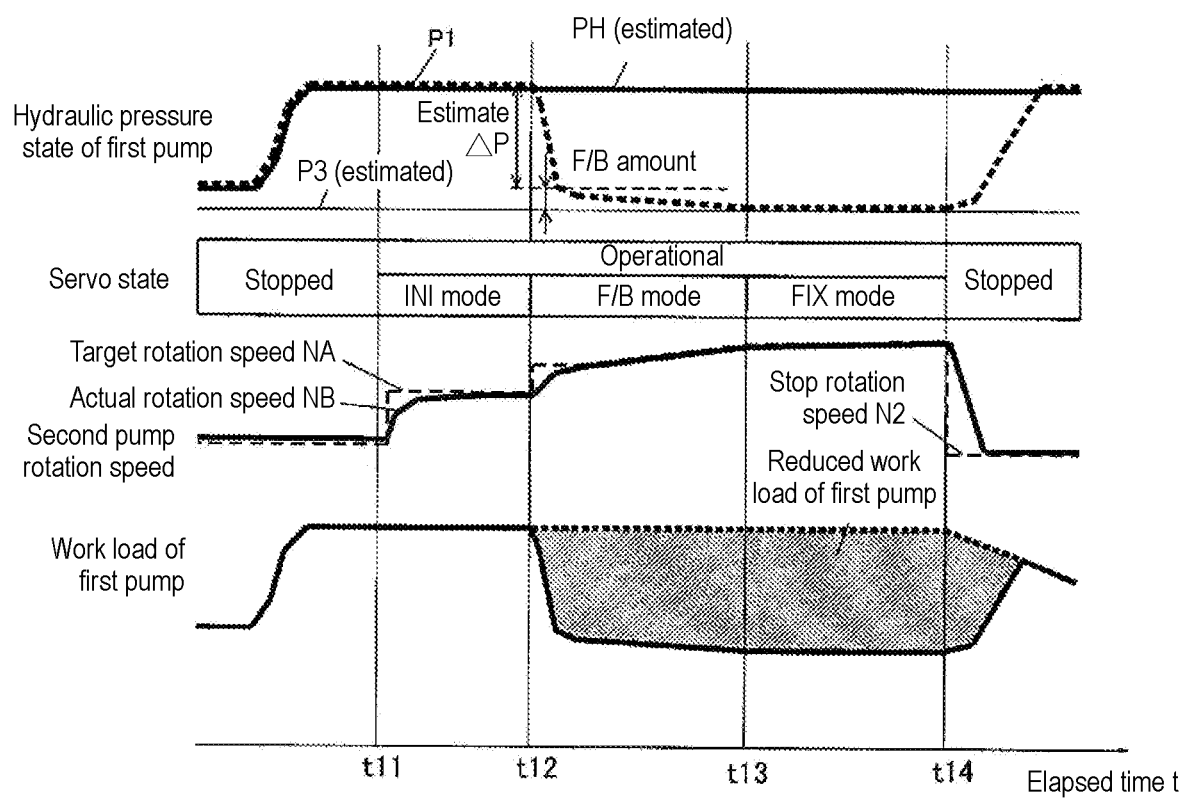
FIG. 7 is a timing chart for illustrating changes in each value in the servo state.

FIG. 7 is a timing chart for illustrating changes in each value in the servo state. This timing chart shows the changes of the output pressure P1, the line pressure PH (estimated value), the low hydraulic pressure P3 (estimated value), the operation state (operational/stopped) and the operation mode (initial mode, feedback mode, fixed mode) of the second pump 30, the target rotation speed NA and the actual rotation speed NB of the second pump 30 with respect to the elapsed time t.

In the timing chart of FIG. 7, the second pump 30 is stopped before the time point tn. In this state, the first oil is supplied from the first pump 20 to the continuously variable transmission mechanism 56 via the bypass valve 58 and the oil passage 50 (see (a) of FIG. 3). Therefore, the output pressure P1 which is the pressure of the first oil flowing through the oil passage 50 is equal to the line pressure PH (output pressure P1=line pressure PH). Further, the low hydraulic pressure P3 is less than the line pressure PH and the output pressure P1 (line pressure PH>low hydraulic pressure P3, output pressure P1>low hydraulic pressure P3).

Then, when the second pump 30 operates at the time point t11, it is then switched to the supply of the second oil from the second pump 30 to the continuously variable transmission mechanism 56 via the oil passage 50 (see (b) of FIG. 3). Therefore, after the state shown in (b) of FIG. 3 is reached, the pressure of the second oil becomes the line pressure PH.

Here, the control unit 28 of the hydraulic control device 10 controls the motor 32 via the driver 34 so that the actual rotation speed NB of the second pump 30 (torque of the second pump 30) increases with respect to the elapsed time t. Accordingly, the flow rate of the second oil discharged from the second pump 30 gradually increases as the actual rotation speed NB of the second pump 30 increases. As a result, after the time point t11, the output pressure P1 can be gradually reduced with the elapsed time t.

Then, in the operation state (servo state) of the second pump 30, the second pump 30 is operated by sequentially passing through each mode of the initial mode (INI mode), the feedback mode (F/B mode) and the fixed mode (FIX mode). In the initial mode, the target rotation speed NA of the second pump 30 increases at the time point t11, and the actual rotation speed NB gradually increases following the target rotation speed NA. Further, in this initial mode, the target rotation speed NA of the second pump 30 is a rotation speed that can discharge only the flow rate required for consumption in the hydraulic operation part (target rotation speed corresponding to only the required flow rate 154 in FIG. 5). Therefore, the output pressure P1 does not decrease during the initial mode. When it is determined that the actual rotation speed NB of the second pump 30 matches the target rotation speed NA, the initial mode ends.

In the feedback mode following the initial mode, the output pressure P1 gradually decreases toward the low hydraulic pressure P3 as the actual rotation speed NB of the second pump 30 gradually increases. At the same time, the feedback control of the rotation speed of the second pump 30 is performed. That is, the control unit 28 performs the feedback control of the rotation speed of the second pump 30 by using the output pressure P1 detected by the output pressure sensor 26, the estimated value of the line pressure PH, and the estimated value of the low hydraulic pressure P3. In this feedback mode, the output pressure P1 is feedback-controlled with the low hydraulic pressure P3 as the target value by feeding back the change amount of the output pressure P1 due to the increase in the actual rotation speed NB of the second pump 30 to the control unit 28.

As a result, for example, due to the error between the control value of each pressure and the actual pressure value and the variation in the discharge performance of the second pump 30, even if the output pressure P1 cannot be reduced to the low hydraulic pressure P3 by using the target rotation speed of open control (the target rotation speed corresponding to the calculated value 158 of the differential pressure ΔP (=line pressure PH−low hydraulic pressure P3) shown in FIG. 5), in the feedback mode after the time point t12, the output pressure P1 can be reduced to the low hydraulic pressure P3 by using the target rotation speed to which the feedback amount (F/B amount 163 in FIG. 5) is added.

When the feedback mode ends at the time point t13, the output pressure P1 drops to the low hydraulic pressure P3 at this time point (P1≈P3), and then the output pressure P1 is maintained at the low hydraulic pressure P3 (fixed mode). That is, in the fixed mode, the state of P1≈P3 is maintained by keeping the rotation speed of the second pump 30 substantially constant. After that, when the operation of the second pump 30 is stopped at the time point t14, the target rotation speed NA of the second pump 30 becomes the stop rotation speed (≈0), and the actual rotation speed NB also decreases following the target rotation speed NA and gradually becomes the stop rotation speed. As a result, after the time point t14, the output pressure P1 gradually increases toward the line pressure PH. When the output pressure P1 is reduced by the operation of the second pump 30 as described above, the work load of the first pump 20 is reduced, and the fuel efficiency of the vehicle 14 can be expected to be improved.

By the way, in the hydraulic control device of the embodiment, the necessity of operating/stopping the second pump 30 is determined with respect to operating the second pump 30 in the servo state as described above. Hereinafter, a method for determining the necessity of operating/stopping the second pump 30 will be described in detail. That is, the control unit 28 determines the operating/stopping of the second pump 30 based on the value of the difference between the work rate reduced for the first pump 20 when the second pump 30 is operated and the power consumption of the second pump 30.

First, the calculation of the work rate reduced for the first pump 20 when the second pump 30 is operated will be described.

When the first pump 20 is operated alone, since it is necessary to supply the first oil from the first pump 20 to the continuously variable transmission mechanism 56 via the bypass valve 58, the pressure of the first oil is the line pressure PH. In this case, the first pump 20 has to supply the first oil to the continuously variable transmission mechanism 56 in a state where the first oil is pressurized to the line pressure PH, which is the value obtained by adding the differential pressure ΔP (ΔP=line pressure PH−low hydraulic pressure P3) to the low hydraulic pressure P3 (pressure of the first oil before pressurization). In this case, the product of multiplying the line pressure PH by the flow rates of the "leakage and shift flow rate," the "warmer flow rate" and the "lubrication flow rate," that is, the work amount corresponding to the discharge amount of the first pump 20, is the work amount of the first pump 20 when the first pump 20 is operated alone.

In addition, when both the first pump 20 and the second pump 30 are operated, since the first pump 20 only needs to be able to supply the first oil to the second pump 30 via the oil passage 22, the pressure of the first oil is suppressed to the low hydraulic pressure P3. Therefore, the second pump 30 pressurizes the first oil from the low hydraulic pressure P3 to the line pressure PH, and supplies the pressurized first oil as the second oil to the continuously variable transmission mechanism 56. That is, the second pump 30 pressurizes the first oil by the differential pressure ΔP and supplies it as the second oil to the continuously variable transmission mechanism 56 and the like.

Figure 8:
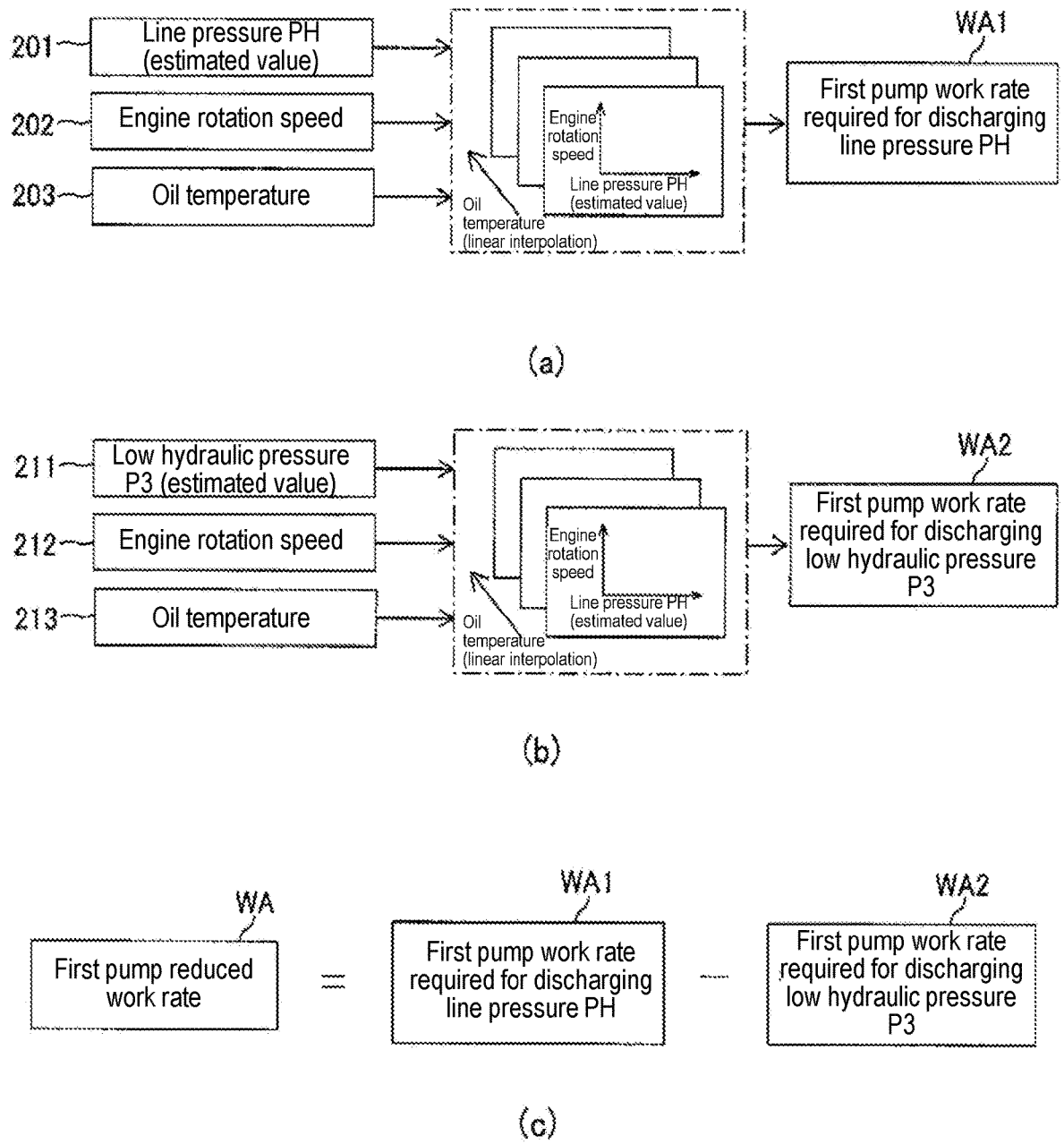
FIG. 8 is a diagram for illustrating the procedures for calculating the work rate reduced for the first pump, and (a) of FIG. 8 shows the procedure for calculating the work rate of the first pump required for discharging the oil with the line pressure, and (b) of FIG. 8 shows the procedure for calculating the work rate of the first pump required for discharging the oil with the low hydraulic pressure, and (c) of FIG. 8 shows the procedure for calculating the work rate reduced for the first pump when the second pump is operated.

FIG. 8 is a diagram for illustrating the procedures for calculating the work rate reduced for the first pump 20, and (a) of FIG. 8 shows the procedure for calculating the work rate of the first pump 20 required for discharging the oil with the line pressure PH, and (b) of FIG. 8 shows the procedure for calculating the work rate of the first pump 20 required for discharging the oil with the low hydraulic pressure P3, and (c) of FIG. 8 shows the procedure for calculating the work rate reduced for the first pump 20 when the second pump 30 is operated.

Here, first, as shown in (a) of FIG. 8, a work rate WA1 of the first pump 20 required for discharging the line pressure PH is calculated based on an estimated value 201 of the line pressure PH calculated by the procedure shown in FIG. 4 above, an engine rotation speed 202 detected by the engine rotation speed sensor 116, and an oil temperature 203 of the first oil or the second oil detected by the oil temperature sensor 118. Specifically, the work rate WA1 of the first pump 20 required for discharging the line pressure PH is calculated by using a graph showing the relationship between the estimated value 201 of the line pressure PH and the engine rotation speed 202 prepared for each oil temperature 203, and the values obtained from them are linearly interpolated by the oil temperature 203 (that is, based on the map of the estimated value 201 of the line pressure PH, the engine rotation speed 202, and the oil temperature 203). Further, the work rate WA1 of the first pump 20 required for discharging the line pressure PH is equivalent to the work rate of the first pump 20 when the second pump 30 is stopped (the first state described above).

Further, as shown in (b) of FIG. 8, the work rate WA2 of the first pump 20 required for discharging the low hydraulic pressure P3 is calculated based on an estimated value 211 of the low hydraulic pressure P3 calculated by the procedure described above, an engine rotation speed 212 detected by the engine rotation speed sensor 116, and an oil temperature 213 of the first oil or the second oil detected by the oil temperature sensor 118. Specifically, the work rate WA2 of the first pump 20 required for discharging the low hydraulic pressure P3 is calculated by using a graph showing the relationship between the estimated value 211 of the low hydraulic pressure P3 and the engine rotation speed 212 prepared for each oil temperature 213, and the values obtained from them are linearly interpolated by the oil temperature 213 (that is, based on the map of the estimated value 211 of the low hydraulic pressure P3, the engine rotation speed 212, and the oil temperature 213). Further, the work rate WA2 of the first pump 20 required for discharging the low hydraulic pressure P3 is equivalent to the work rate of the first pump 20 when the second pump 30 is operated (the second state described above).

Then, as shown in (c) of FIG. 8, the reduced work rate WA of the first pump 20 when the second pump 30 is operated is calculated by subtracting the work rate WA2 of the first pump 20 required for discharging the low hydraulic pressure P3 calculated in (b) of FIG. 8 from the work rate WA1 of the first pump 20 required for discharging the line pressure PH calculated in (a) of FIG. 8.

Figure 9:
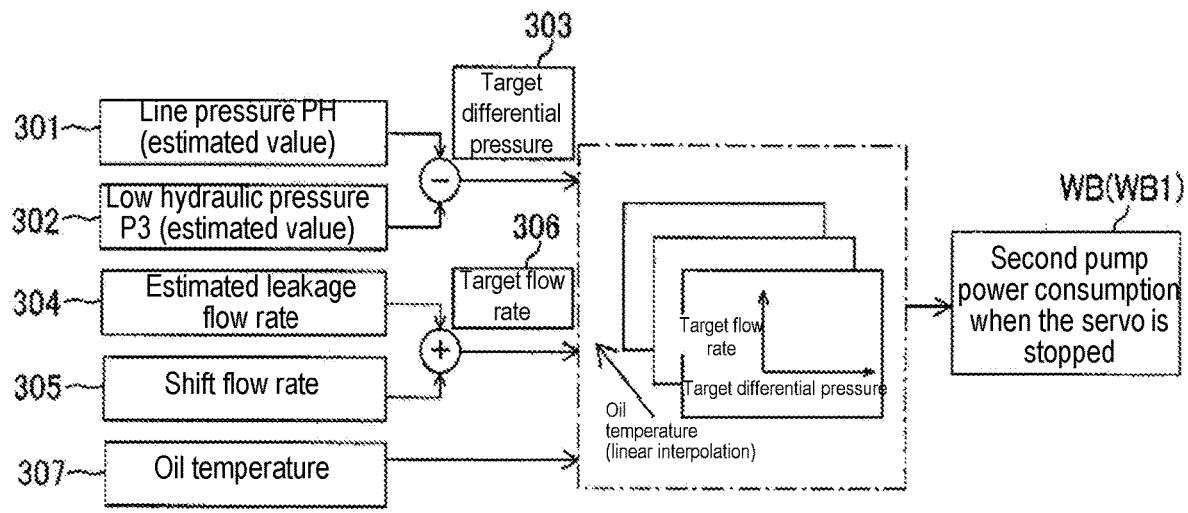
FIG. 9 is a diagram for illustrating the procedures for calculating the power consumption of the second pump, and (a) of FIG. 9 shows the procedure for calculating the power consumption of the second pump when the second pump is stopped, and (b) of FIG. 9 shows the procedure for calculating the power consumption of the second pump when the second pump is operated.
Figure 9:
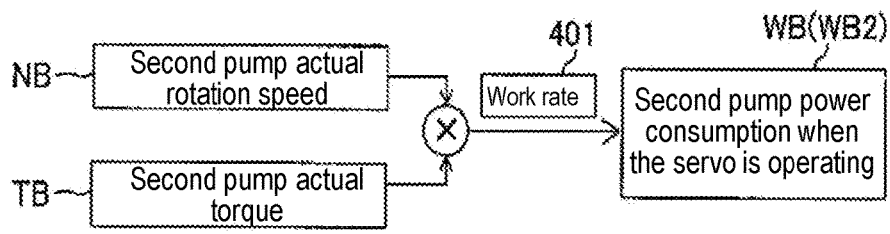

Next, the calculation of the power consumption of the second pump 30 will be described. Here, the power consumption of the second pump 30 is calculated by different methods when the second pump 30 is stopped and when it is operated. Therefore, the calculation of the power consumption when the second pump 30 is stopped and when it is operated will be described below, respectively. FIG. 9 is a diagram for illustrating the procedures for calculating the power consumption of the second pump 30, and (a) of FIG. 9 shows the procedure for calculating the power consumption when the second pump 30 is stopped, and (b) of FIG. 9 shows the procedure for calculating the power consumption when the second pump 30 is operated.

First, when the second pump 30 is stopped, as shown in (a) of FIG. 9, a target differential pressure 303 is calculated from the difference between an estimated value 301 of the line pressure PH calculated by the procedure shown in FIG. 4 above and an estimated value 302 of the low hydraulic pressure P3 calculated by the procedure described above. Further, a target flow rate 306 is calculated from the sum of an estimated leakage flow rate 304 and a shift flow rate 305 of the continuously variable transmission mechanism 56.

Figure 10:
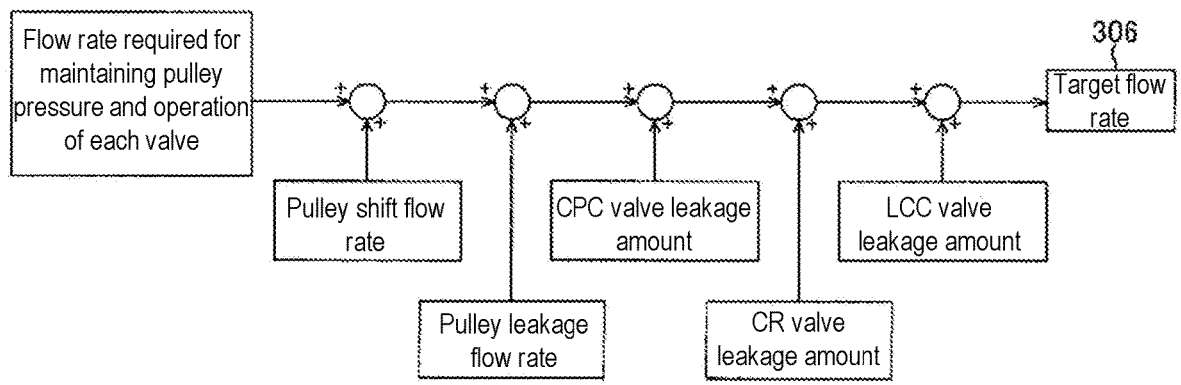
FIG. 10 is a diagram for illustrating the procedure for calculating the target flow rate.

FIG. 10 is a diagram for illustrating the procedure for calculating the target flow rate 306. As shown in the figure, the target flow rate 306 is calculated by adding the flow rates required for maintaining the pulley pressure of the driven pulley 56a and drive pulley 56b, the shift flow rate 305 and the estimated leakage flow rate 304 (that is, that is, the "pulley shift flow rate," the "pulley leakage amount," the "CPC valve leakage amount," the "CR valve leakage amount," and the "LCC valve leakage amount" in FIG. 10) of the continuously variable transmission mechanism 56 calculated by the procedure described above for the flow rate required for the operation of each valve in the transmission 12. That is, when the second oil is supplied from the second pump 30 to the continuously variable transmission mechanism 56 or the like, the target flow rate 306 is calculated by adding up the flow rate of the second oil supplied to the supply target such as the continuously variable transmission mechanism 56 and the leakage amount generated in the passage in the middle.

With reference back to (a) of FIG. 9, a power consumption WB (WB1) of the second pump 30 when the second pump 30 is stopped is calculated based on the target differential pressure 303 and the target flow rate 306 as well as an oil temperature 307 of the first oil or the second oil detected by the oil temperature sensor 118. Specifically, the power consumption WB (WB1) of the second pump 30 when the second pump 30 is stopped (when the servo is stopped) is calculated by using a graph showing the relationship between the target differential pressure 303 and the target flow rate 306 prepared for each oil temperature 307, and the values obtained from them are linearly interpolated by the oil temperature 307 (that is, based on the map of the target differential pressure 303, the target flow rate 306, and the oil temperature 307).

Further, the data used in the calculation of the power consumption WB (WB1) of the second pump 30 when the second pump 30 is stopped is not the own data of the second pump 30 or other products mounted on the vehicle; instead, the data extracted (or estimated to be extracted) from a general (average) manufactured product of the corresponding model is used. In this case, it is desirable to use the average value (called nominal value) extracted from the manufactured product (central product) having a larger production volume (manufactured volume).

Next, when the second pump 30 is operated, as shown in (b) of FIG. 9, the power consumption WB (WB2) of the second pump 30 is calculated based on the actual rotation speed NB and an actual torque TB of the second pump 30. That is, a work rate 401 of the second pump 30 is calculated by multiplying the actual rotation speed NB by the actual torque TB of the second pump 30, and the power consumption WB (WB2) of the second pump 30 when the second pump 30 is operated (when the servo is operating) is calculated based on the calculated work rate 401.

Then, in the hydraulic control device of the embodiment, when the value of the difference between the reduced work rate WA of the first pump 20 and the power consumption WB1 of the second pump 30 when the second pump 30 is stopped is greater than a threshold value W1 (WA−WB1>W1), the second pump 30 is operated. On the other hand, when the value of the difference between the reduced work rate WA of the first pump 20 and the power consumption WB2 of the second pump 30 when the second pump 30 is operated is less than or equal to the threshold value W1 (WA−WB2≤W1), the second pump 30 is stopped. Here, the power consumption WB1 when the second pump 30 is stopped is a value of the power consumption calculated by the procedure of (a) of FIG. 9 above, and the power consumption WB2 when the second pump 30 is operated is a value of the power consumption calculated by the procedure of (b) of FIG. 9 above.

According to the hydraulic control device of the embodiment, as described above, by determining the operating/stopping of the second pump 30 based on the value of the difference between the work rate reduced for the first pump 20 due to the operation of the second pump 30 and the power consumption of the second pump 30, the second pump 30 can be operated or stopped by appropriately determining the region where energy efficiency such as the fuel efficiency of the vehicle can be improved by operating the second pump 30.

Then, when the second pump 30 is stopped, as shown in (a) of FIG. 9, by estimating the power consumption of the second pump 30 based on the estimated value of the line pressure PH, which is the pressure of oil supplied to the continuously variable transmission mechanism 56, and the estimated value of the low hydraulic pressure P3, which is the pressure of oil supplied from the first pump 20 to the hydraulic operation part of the low pressure system such as the torque converter 114 and the lubrication system 108 via the oil passage 90, the operating/stopping of the second pump 30 can be determined based on the general performance of the model regardless of the actual function (function that varies from product to product) of the first pump 20 and the second pump 30 or other devices actually mounted on the vehicle.

On the other hand, when the second pump 30 is operated, as shown in (b) of FIG. 9, by estimating the power consumption WB of the second pump 30 based on the actual rotation speed NB and the actual torque TB of the second pump 30, the operating/stopping of the second pump 30 can be determined based on the function of the devices including the second pump 30 actually mounted on the vehicle (function of the product).

In this way, when the second pump 30 is stopped, the operating/stopping of the second pump 30 is determined based on the general performance of the model, and when the second pump 30 is operated, the operating/stopping of the second pump 30 is determined based on the function of the devices actually mounted on the vehicle. As a result, the operating/stopping of the second pump 30 can be more appropriately determined, whereby the fuel efficiency of the vehicle can be improved more effectively. That is, when the second pump 30 is stopped, as described above, by estimating the power consumption WB of the second pump 30 based on the estimated value of the line pressure PH and the estimated value of the low hydraulic pressure P3, if it is determined that the operation of the second pump 30 has the effect of improving the fuel efficiency of the vehicle based on this estimated power consumption of the second pump 30, the second pump 30 is operated. Thereafter, when the second pump 30 is operated, as described above, by estimating the power consumption of the second pump 30 based on the actual rotation speed NB and the actual torque TB of the second pump 30, if it is determined that the operation of the second pump 30 does not have the effect of improving the fuel efficiency of the vehicle based on this estimated power consumption of the second pump 30, the second pump 30 is stopped. Therefore, since the operating/stopping of the second pump 30 can be determined based on a value that reflects the actual operating condition of the second pump 30, especially when the second pump 30 is operated, whether there is an improvement in energy efficiency such as fuel efficiency of the vehicle can be determined more appropriately.

Further, here, the value of the threshold value W1 may be different depending on the stopped state of the second pump 30 and the operating state of the second pump 30. In this case, for example, a threshold value W11 when the second pump 30 is stopped can be set to a value greater than a threshold value W12 when the second pump 30 is operated (W11>W12). In this way, by setting the threshold value W11 when the second pump 30 is stopped to a value greater than the threshold value W12 when the second pump 30 is operated, the hunting phenomenon in which the operating/stopping of the second pump 30 is frequently switched can be effectively prevented.

Although the embodiments of the disclosure have been described above, the disclosure is not limited to the above embodiments, and various modifications may be made within the scope of claims and the technical ideas described in the specification and drawings.

What is claimed is:

1. A hydraulic control device in which a second pump and a bypass valve that are driven by a motor are connected in parallel between a first pump and a hydraulic operation part of a transmission, and which is switchable between a first state of supplying a first oil from the first pump to the hydraulic operation part via the bypass valve when the second pump is stopped and a second state of pressurizing with the second pump the first oil supplied from the first pump and supplying the pressurized first oil as a second oil to the hydraulic operation part when the second pump is operated, the hydraulic control device comprising:
a control part which controls operating/stopping of the second pump,
wherein the control part
determines the operating/stopping of the second pump based on a value of a difference between a work rate reduced for the first pump when the second pump is operated and a power consumption of the second pump,
in a state where the second pump is stopped, calculates the power consumption of the second pump based on an estimated value of a pressure of oil supplied to the hydraulic operation part and an estimated value of a pressure of oil supplied from the first pump to another hydraulic operation part or a lubrication target operating at a lower pressure than the hydraulic operation part, and
in a state where the second pump is operated, calculates the power consumption of the second pump based on an actual rotation speed and an actual torque of the second pump.

2. The hydraulic control device according to claim 1, wherein the second pump is operated when the value of the difference between the work rate reduced for the first pump and the power consumption of the second pump in the state where the second pump is stopped is greater than a threshold value, and
the second pump is stopped when the value of the difference between the work rate reduced for the first pump and the power consumption of the second pump in the state where the second pump is operated is less than or equal to the threshold value.

3. The hydraulic control device according to claim 2, wherein values of the threshold value are set to different values between the state where the second pump is stopped and the state where the second pump is operated.

4. The hydraulic control device according to claim 3, wherein the threshold value in the state where the second pump is stopped is set to a value greater than the threshold value in the state where the second pump is operated.

5. The hydraulic control device according to claim 1, wherein the first pump is a mechanical pump which operates with a rotation of an engine, and the hydraulic control device further comprises:
   an engine rotation speed detection part which detects a rotation speed of the engine; and
   an oil temperature detection part which detects an oil temperature of the first oil or the second oil,
   wherein the work rate reduced for the first pump due to the operation of the second pump is a value calculated based on the estimated value of the pressure of the oil supplied to the hydraulic operation part, the estimated value of the pressure of the oil supplied from the first pump to the another hydraulic operation part or the lubrication target, the rotation speed of the engine, and the oil temperature of the first oil or the second oil.

6. The hydraulic control device according to claim 2, wherein the first pump is a mechanical pump which operates with a rotation of an engine, and the hydraulic control device further comprises:
   an engine rotation speed detection part which detects a rotation speed of the engine; and
   an oil temperature detection part which detects an oil temperature of the first oil or the second oil,
   wherein the work rate reduced for the first pump due to the operation of the second pump is a value calculated based on the estimated value of the pressure of the oil supplied to the hydraulic operation part, the estimated value of the pressure of the oil supplied from the first pump to the another hydraulic operation part or the lubrication target, the rotation speed of the engine, and the oil temperature of the first oil or the second oil.

7. The hydraulic control device according to claim 3, wherein the first pump is a mechanical pump which operates with a rotation of an engine, and the hydraulic control device further comprises:
   an engine rotation speed detection part which detects a rotation speed of the engine; and
   an oil temperature detection part which detects an oil temperature of the first oil or the second oil,
   wherein the work rate reduced for the first pump due to the operation of the second pump is a value calculated based on the estimated value of the pressure of the oil supplied to the hydraulic operation part, the estimated value of the pressure of the oil supplied from the first pump to the another hydraulic operation part or the lubrication target, the rotation speed of the engine, and the oil temperature of the first oil or the second oil.

8. The hydraulic control device according to claim 4, wherein the first pump is a mechanical pump which operates with a rotation of an engine, and the hydraulic control device further comprises:
   an engine rotation speed detection part which detects a rotation speed of the engine; and
   an oil temperature detection part which detects an oil temperature of the first oil or the second oil,
   wherein the work rate reduced for the first pump due to the operation of the second pump is a value calculated based on the estimated value of the pressure of the oil supplied to the hydraulic operation part, the estimated value of the pressure of the oil supplied from the first pump to the another hydraulic operation part or the lubrication target, the rotation speed of the engine, and the oil temperature of the first oil or the second oil.

* * * * *